(12) United States Patent
Wilden

(10) Patent No.: US 10,921,416 B1
(45) Date of Patent: Feb. 16, 2021

(54) MULTIVARIATE POSITION ESTIMATION

(71) Applicant: L3 Technologies, Inc., New York, NY (US)

(72) Inventor: Jason Wilden, Salt Lake City, UT (US)

(73) Assignee: L3 Technologies, Inc., New York, NY (US)

( * ) Notice: Subject to any disclaimer, the term of this patent is extended or adjusted under 35 U.S.C. 154(b) by 95 days.

(21) Appl. No.: 16/121,486

(22) Filed: Sep. 4, 2018

(51) Int. Cl.
*G01S 5/02* (2010.01)
*G01S 11/10* (2006.01)

(52) U.S. Cl.
CPC .......... *G01S 5/0278* (2013.01); *G01S 5/0294* (2013.01); *G01S 11/10* (2013.01); *B60G 2401/15* (2013.01); *B60L 2260/50* (2013.01); *B60L 2260/58* (2013.01)

(58) Field of Classification Search
USPC ......................................................... 701/465
See application file for complete search history.

(56) References Cited

U.S. PATENT DOCUMENTS

| | | | | |
|---|---|---|---|---|
| 5,890,068 | A * | 3/1999 | Fattouche | G01S 5/06 342/457 |
| 9,880,259 | B2 * | 1/2018 | Ramlall | G01S 5/0273 |
| 2004/0032361 | A1 * | 2/2004 | Kirscht | G01S 13/9029 342/25 R |
| 2007/0010956 | A1 * | 1/2007 | Nerguizian | G01C 21/206 702/57 |
| 2008/0133126 | A1 * | 6/2008 | Dupray | G01S 5/0252 701/408 |
| 2017/0276480 | A1 * | 9/2017 | Hedley | G01S 5/0294 |
| 2018/0284149 | A1 * | 10/2018 | Kommi | G01C 21/165 |

* cited by examiner

*Primary Examiner* — Nicholas K Wiltey
*Assistant Examiner* — Terry C Buse
(74) *Attorney, Agent, or Firm* — Kirton McConkie; Brian Tucker

(57) ABSTRACT

Multivariate position estimation can be performed to provide a position estimate of a moving object. The multivariate position estimation approach can employ multiple types of information including time of arrival (or time difference of arrival), angle of arrival, Doppler, and/or prior location information in an iterative process to calculate a location estimate that is highly accurate. In particular, the multivariate position estimation approach can employ the statistical quality of each of these types of information to quickly arrive at a highly accurate position estimate within a 3D coordinate system. The multivariate position estimation approach can be implemented in environments where a single receiver is available as well as in environments where multiple receivers exist.

16 Claims, 4 Drawing Sheets

MULTIVARIATE POSITION ESTIMATION

CROSS-REFERENCE TO RELATED APPLICATIONS

N/A

BACKGROUND

Geolocation refers to estimating the location of an object and is used in a wide variety of applications. There is also a wide variety of geolocation techniques. Some of these techniques only provide a general estimate of an object's location (e.g., a city in which the object is located), while others can provide a highly accurate estimate (e.g., latitude, longitude, and altitude of the object). The present invention is directed to improving these highly accurate geolocation techniques.

Most highly accurate geolocation techniques rely on multiple anchors (or known position sources) and therefore require complex systems to implement. This is especially true when geolocation must be performed in GPS denied spaces. Additionally, even with multiple anchors, many geolocation techniques may still fail to provide sufficient accuracy for many applications. For example, autonomous vehicles and other applications where objects are steered oftentimes require position estimates that are both highly accurate and capable of being produced in real-time.

BRIEF SUMMARY

The present invention extends to methods, systems and computer program products for performing multivariate position estimation. The multivariate position estimation approach of the present invention can employ multiple types of information including time of arrival (or time difference of arrival), angle of arrival, Doppler, and/or prior location information in an iterative process to calculate a location estimate that is highly accurate. In particular, the multivariate position estimation approach can employ the statistical quality of each of these types of information to quickly arrive at a highly accurate position estimate within a 3D coordinate system. The multivariate position estimation approach can be implemented in environments where a single receiver (i.e., a single anchor) is available as well as in environments where multiple receivers exist.

In one embodiment, the present invention is implemented by a tracker as a method for performing multivariate position estimation comprising. The tracker receives a communication emitted from a moving object and processes the communication to generate a time of arrival measurement, an angle of arrival measurement, and a Doppler measurement for the communication. The tracker also obtains a tracker location representing where the tracker was located when the communication was received. The tracker then estimates an object location representing where the moving object was located when the moving object emitted the communication using the time of arrival measurement, the angle of arrival measurement, the Doppler measurement, and the tracker location.

In another embodiment, the present invention is implemented as a tracker that includes: one or more antennas for receiving a communication emitted from a moving object; a time of arrival component that generates a time of arrival measurement for the communication; an angle of arrival component that generates an angle of arrival measurement for the communication; a Doppler component that generates a Doppler measurement for the communication; a tracker location component that obtains a tracker location representing where the tracker was located when the communication was received; and a location engine that receives and processes the time of arrival measurement, the angle of arrival measurement, the Doppler measurement, and the tracker location to estimate an object location representing where the moving object was located when the moving object emitted the communication.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "tracker" should be construed as any computing system that is configured to receive periodic communications from a moving object and employ various types of information derived from the periodic communications to estimate a position of the moving object. The term "computing device" should be construed generally to encompass each of the various types of hardware platforms that one of skill in the art could use to implement the techniques of the present invention (e.g., a CPU platform, a microprocessor platform, an ASIC platform, an FPGA platform, a DSP platform, etc.). The term computing system should be construed as including one or more computing devices. Furthermore, although a tracker will be described primary as a single physical node, in some embodiments, a tracker can encompass more than one physical node. For example, a tracker could encompass two or more physically separated computing devices (i.e., two or more nodes).

Figure 1:
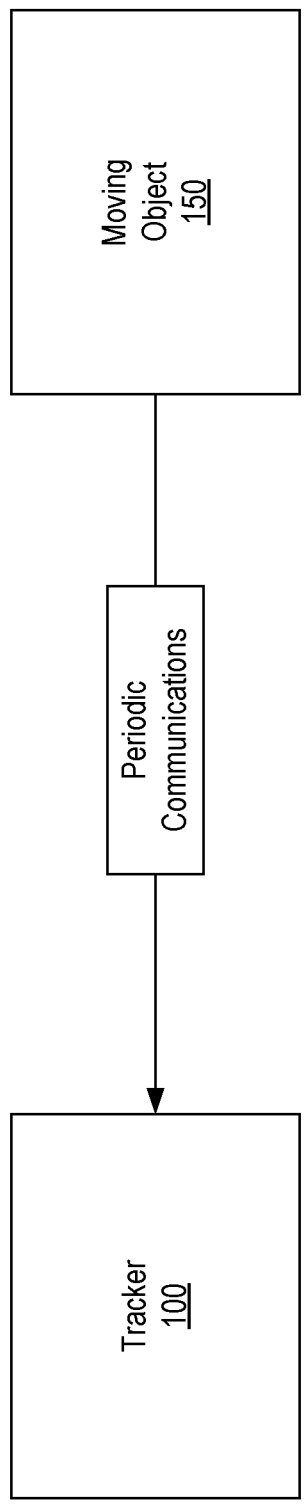
FIG. 1 illustrates a typical environment in which the present invention may be implemented which includes a moving object and a tracker that is configured to estimate the position of the moving object.

FIG. 1 illustrates an example environment in which the present invention could be implemented. As shown, a tracker 100 is configured to receive periodic communications from a moving object 150. Moving object 150 can represent any type of moving object capable of transmitting periodic communications. Although it should not be limited to such use cases, the present invention may be particularly beneficial in environments where tracker 100 is employed to steer moving object 150. For example, moving object 150 could be an object or a vehicle. Further, although not limited to such environments, the present invention may be particularly beneficial when moving object 150 is in a GPS denied space or when available GPS techniques will not provide sufficient accuracy.

Figure 2:
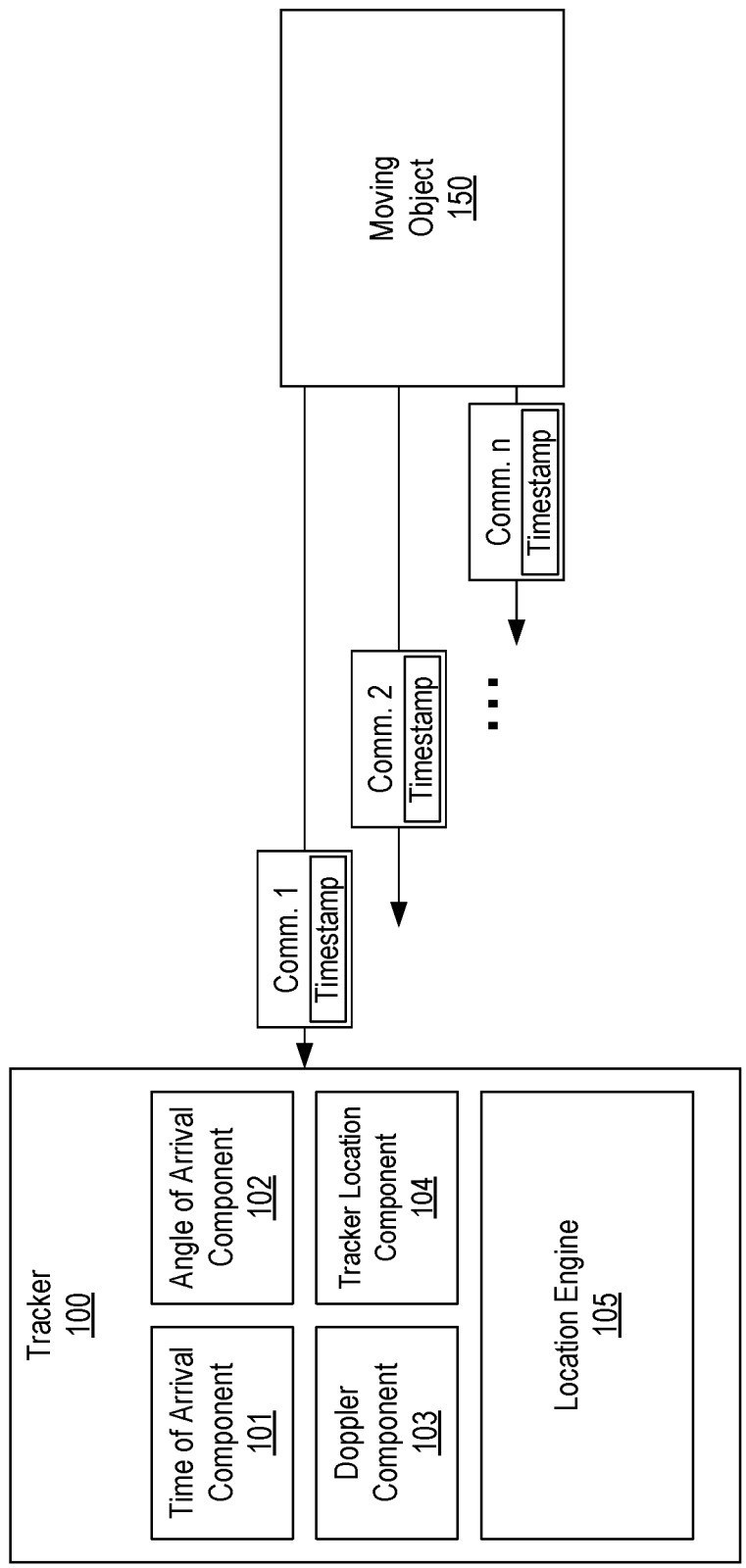
FIG. 2 illustrates an example architecture of a tracker that is configured to implement the multivariate position estimation approach of the present invention based on periodic communications from the moving object.

FIG. 2 illustrates an example architecture of tracker 100. As mentioned above, tracker 100 is configured to receive periodic communications from moving object 150. As shown, these periodic communications can each include a timestamp. In the following description, it will be assumed that moving object 150 is configured to generate a timestamp locally for inclusion in each communication to represent the time of transmission of the communication. In such cases, it will be assumed that tracker 100 and moving object 150 have synchronized clocks to allow tracker 100 to use time of arrival techniques. In other embodiments, moving object 150 may not include a timestamp in the periodic communications, and in such cases, tracker 100 may implement time difference of arrival techniques. In other embodiments, tracker 100 may be configured to transmit periodic communications that include a timestamp generated at tracker 100, and moving object 150 may include such timestamps in the periodic communications that it sends back to tracker 100 (which may eliminate the need for the clocks to be synchronized). In any case, moving object 150 is configured to transmit periodic communications to tracker 100, and tracker 100 is configured to process these periodic communications for purposes of implementing multivariate position estimation.

To generate the different types of information for the multivariate position estimation, tracker 100 can include a time of arrival component 101 (which could equally be a time difference of arrival component in some embodiments), an angle of arrival component 102, a Doppler component 103, and a tracker location component 104. Tracker 100 also includes a location engine 105 which is configured to generate position estimates based on the information provided from components 101-104.

Time of arrival component 101 can represent any combination of hardware and/or software components that are configured to generate time of arrival information for each periodic communication received from moving object 150. For example, time of arrival component 101 can be configured to detect when a periodic communication is received and to generate a corresponding "receive timestamp." This receive timestamp will be represented in the figures as $ToA_i$ where i represents the relative order of the communication. Time of arrival component 101 can also be configured to extract the "transmit timestamp" from the periodic communication which represents when the periodic communication was sent (whether by moving object 150 or by tracker 100). This transmit timestamp will be represented in the figures as $timestamp_i$.

As mentioned above, the transmit timestamp may represent either (1) when the periodic communication received at tracker 100 was sent by moving object 150; or (2) when a corresponding periodic communication was sent by tracker 100 to moving object 150. In this later case, moving object 150 can be viewed as simply relaying a received communication back to tracker 100. In either case, the difference between the receive timestamp and the transmit timestamp can represent the distance between moving object 150 and tracker 100 as will be further described below.

Angle of arrival component 102 can represent a monopulse antenna, a parabolic antenna, a phased array, or other suitable antenna configuration that can detect the angle at which the periodic communication arrives at tracker 100. The angle of arrival for a particular periodic communication will be represented in the figures as $AoA_i$ where i again represents the relative order of the communication (e.g., $ToA_1$ and $AoA_1$ can define when and at what angle a "first" periodic communication was received).

Doppler component 103 can represent any combination of hardware and/or software components that are configured to calculate the Doppler shift of each periodic communication. The Doppler shift for a particular periodic communication will be represented in the figures as $Dopp_i$ where i again represents the relative order of the communication.

Finally, tracker location component 104 can represent any combination of hardware and/or software components that are configured to maintain/provide known locations of tracker 100 at periodic intervals which generally correspond with the timing at which the periodic communications are received. These known locations can be represented in X, Y, and Z coordinates (or another suitable coordinate system) as $X_i, Y_i, Z_i$ where i represents the relative order of the periodic communication to which the location corresponds (e.g., $X_1, Y_1, Z_1$ can represent the location of tracker 100 when it received a periodic communication from which $ToA_1$, $AoA_1$, and $Dopp_1$ were generated). If tracker 100 is stationary, this known location would remain constant. However, when tracker 100 is moving, the known location will likely change for each received periodic communication. One of skill in the art would understand that there are many different ways to determine the location of tracker 100 each of which could be employed by tracker location component 104.

Figure 3:
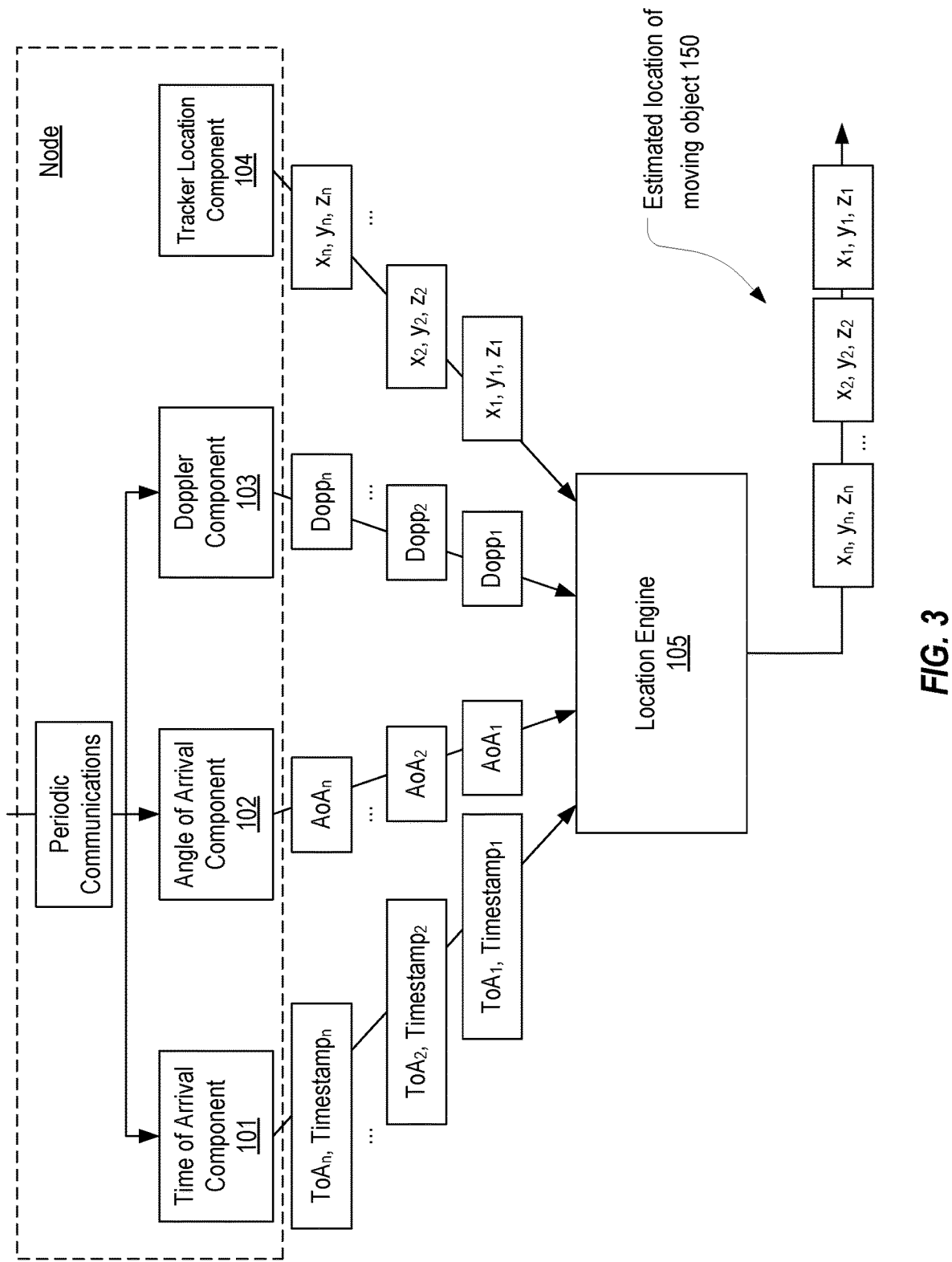
FIG. 3 illustrates various types of information that can be provided to a location engine for estimating a location of the moving object.

FIG. 3 illustrates an example of how these various types of information can be provided to location engine 105 as periodic communications are received. In this example, it is assumed that time of arrival is employed and therefore time of arrival component 101 is shown as providing a series of transmit/receive timestamp pairs ($ToA_i$, $Timestamp_i$). Alternatively, if time difference of arrival is employed, component 101 could instead provide a series of receive timestamps. Angle of arrival component 102, Doppler component 103, and tracker location component 104 are each similarly shown as providing a series of angles of arrival, Doppler shifts, and known locations respectively.

In this example, it is assumed that tracker 100 includes a single physical node. However, in other embodiments, tracker 100 may employ multiple physical nodes (e.g., two nodes that each independently receives the periodic communications). In such cases, the second physical node would include its own time of arrival component 101, angle of arrival component 102, and Doppler component 103 (and possibly its own tracker location component 104 if it is spaced a significant distance from the first receiver) to provide independent series of information to location engine 105. It is noted however that one benefit of the present invention is that a highly accurate position estimate can be generated with only a single node.

In summary, for each received periodic communication, each node of tracker 100 will generate time of arrival information, angle of arrival information, Doppler information, and tracker location information and provide this information to location engine 105. Location engine 105 can then use this information in an iterative manner to generate a location estimate for moving object 150. By including the node's location information in this process, the location estimate can be an actual location rather than a relative location with respect to tracker 100. In this regard, if a location estimate relative to tracker 100 is sufficient, the node location information could be excluded from the process.

In accordance with embodiments of the present invention, location engine 105 can be configured to implement a cost function by which moving object 150's position can be estimated. This cost function can be represented as:

$$\hat{\alpha} = \mathrm{argmin}_{\alpha} \sum_{i=1}^{R}\sum_{j=1}^{T}\left\{\frac{(t_{ij}-\tau_{ij}(\alpha))^2}{\sigma_{\tau}^2} + \frac{(\theta_{ij}-\varphi_{ij}(\alpha))^2}{\sigma_{\varphi}^2} + \frac{(\dot{f}_{ij}-\dot{\delta}_{ij}(\alpha))^2}{\sigma_{\delta}^2} + \alpha_0\right\}$$

where $\hat{\alpha}$ is the estimated position, T represents time, R represents the node (or "receiver," which may be 1 or more), $t_{ij}$ represents the known (or measured) time of arrival, $\theta_{ij}$ represents the known angle of arrival, $\dot{f}_{ij}$ represents the known frequency, and $\alpha_0$ represents a priori information defining uncertainty of tracker 100's known position. The values of $\sigma_{\tau}^2$, $\sigma_{\varphi}^{-2}$, and $\sigma_{\delta}^2$ represent a confidence of the time of arrival, angle of arrival and Doppler measurements respectively, and $\tau_{ij}(a)$, $\varphi_{ij}(a)$, and $\dot{\delta}_{ij}(\alpha)$ are the variables whose values can be selected using a non-linear least squares algorithm (e.g., the Levenberg-Marquardt algorithm) to minimize the cost function.

To implement this cost function from the measurements received from components 101-104, location engine 105 can be configured to process the measurements using the following version of the cost function:

$$\hat{\alpha} = c_1 + c_2 + c_3 + c_4$$

where $c_1$ represents the Doppler component of the cost function, $c_2$ represents the time of arrival component of the cost function, $c_3$ represents the angle of arrival component of the cost function, and $c_4$ represents the node location component of the cost function.

Each of the $c_1$ through $c_4$ components can be defined in terms of the following position vector:

$$\vec{P} = [A(1)-\overrightarrow{B(n,1)}, A(2)-\overrightarrow{B(n,2)}, A(3)-\overrightarrow{B(n,3)}]$$

where A is the unknown position of moving object 150 defined as $A=[x_i, y_i, z_i]$ and $\vec{B}$ is an $n \times 1$ vector (where n represents the number of nodes employed by tracker 100) of the position of the node of interest defined as $B=[x(n\times1)_i, y(n\times1)_i, z(n\times1)_i]$.

In particular, $c_1$ can be defined as:

$$c_1 = \frac{\tau_{obs} - \frac{\|\overrightarrow{AB}\|}{c} - \tau_e}{\sigma_{\tau}}$$

where $\tau_{obs}$ is the measured time of arrival for the node of interest (i.e., $ToA_i$), c is the speed of light, and $\tau_e$ is the emission time if known. If the emission time is not known this value is set to zero. $\sigma_{\tau}$ is the standard deviation of time of arrival component 101.

$c_2$ is defined as:

$$c_2 = \frac{\theta - \varphi}{\sigma_{\varphi}}$$

Where $\theta$ is defined as the four quadrant arctangent function of the two dimensional x, y plane between A and B. $\varphi$ is the measured angle of arrival (i.e., $AoA_i$). The operation of $\theta - \varphi$ is defined as taking the modulus of each operand relative to $\pi$ and subtracting the difference. If the operand is greater than $\pi$ then the sign of the resulting modulus operation is flipped prior to the difference being taken. $\sigma_{\varphi}$ is the standard deviation of angle of arrival component 102.

$c_3$ is defined as:

$$c_3 = \frac{f_{dm} + f_c - f_e - \frac{\|\overrightarrow{AB}\| \cdot \vec{V}}{\lambda}}{\sigma_{\delta}}$$

where $\sigma_{\delta}$ is the standard deviation of Doppler component 103, $f_{dm}$ is the measured Doppler frequency (i.e., $Dopp_i$), $f_c$ is the carrier frequency of the node of interest, $f_e$ is the measured frequency error, and V is the known velocity of the known node.

Finally, $c_4$ is defined as:

$$c_4 = W^T \overline{pos}^{554} W$$

Where $W=pos-\overline{pos}$, pos is the x, y, z of the known position of the tracker and $\overline{pos}$ is the mean position of x, y, z. † is defined as the pseudo inverse, sometimes known as the Moore-Penrose inverse. Notably, the $c_4$ component accounts for the a priori uncertainty of the tracker's known position. For example, if the tracker's known position is determined using GPS, the accuracy of the GPS system can be accounted for within $c_4$ which in essence allows the known position to float in the cost function (as opposed to having the known position fixed). More specifically, by employing $c_4$ rather than a fixed known position, minimizing the cost function will yield more accurate estimates for the other components.

Accordingly, the cost function to be minimized can be implemented within location engine 105 as:

$$\hat{\alpha} = \mathrm{argmin}_{\alpha} \sum_{i=1}^{R}\sum_{j=1}^{T}\{c_1 + c_2 + c_3 + c_4\}$$

Location engine 105 can continuously receive the series of time of arrival measurements ($ToA_i$), the series of angle of arrival measurements ($AoA_i$), the series of Doppler measurement ($Dopp_i$), and the series of locations ($B_i$), and for each set of measurements (e.g, $ToA_1$, $AoA_1$, $Dopp_1$, and $B_1$), can input the measurements into the respective component ($c_1$-$c_4$) and then minimize the cost function by a non-linear least squares algorithm (e.g., Levenberg-Marquardt). The values of A that produce a minimum can be selected as the estimated position of moving object 150 at the corresponding time. Because location engine 105 generates this estimated position from the time of arrival, angle of arrival, Doppler shift, and known location of the node(s), a highly accurate estimate can be obtained even when tracker 100 employs a single node.

Figure 4:
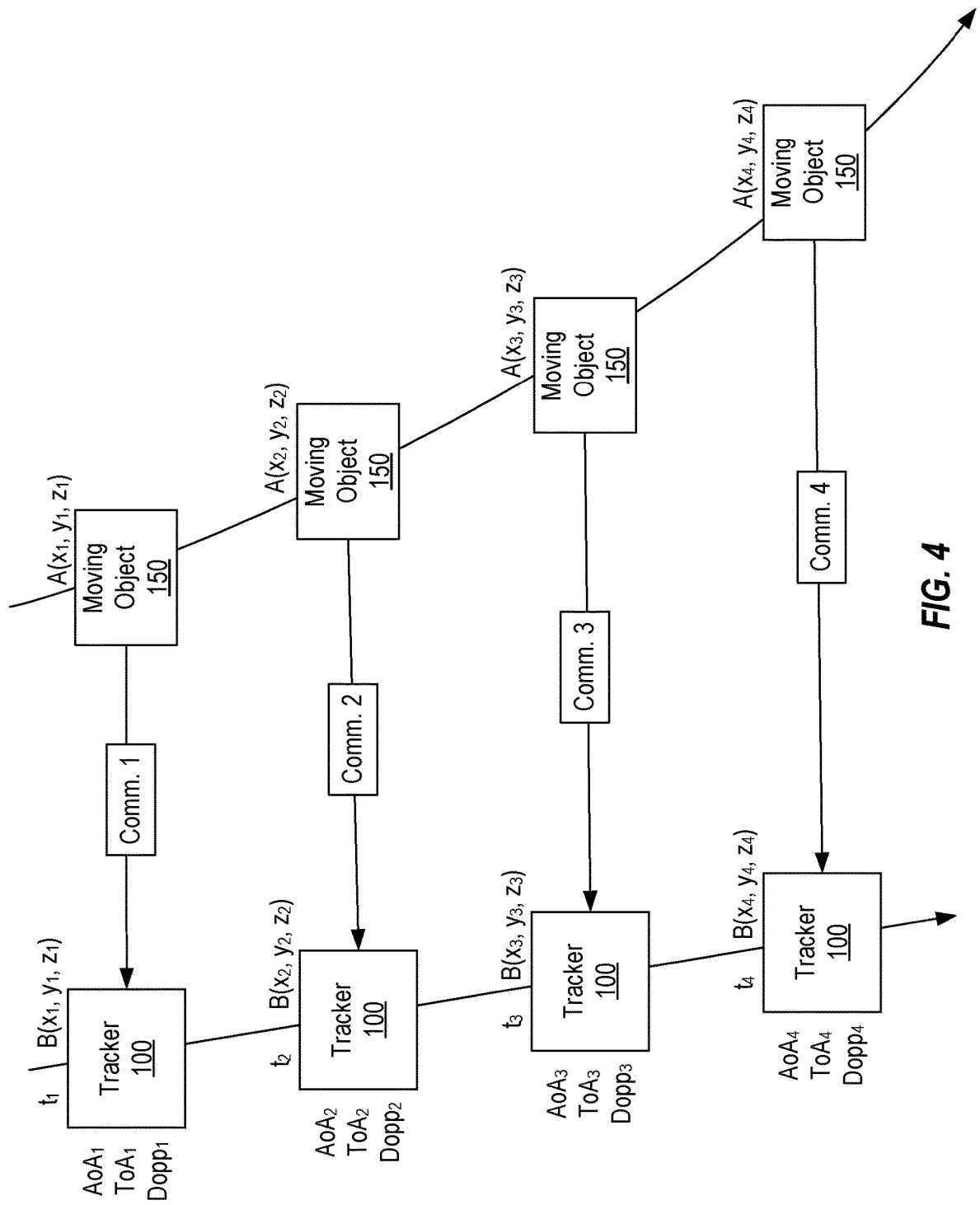
FIG. 4 illustrates an example of how a tracker can receive a series of communications and generate measurements that can be employed to estimate a position of the object that emitted the communications.

FIG. 4 illustrates an example scenario in which the present invention could be employed. As shown, tracker 100 is assumed to be moving in a straight direction while moving object 150 is moving in a similar direction but along a curved path. For example, tracker 100 could be part of an aircraft and moving object 150 could be an object launched from the aircraft. Moving object 150 is shown as emitting four communications at periodic intervals as it traverses this path, and these communications are assumed to be received at tracker 100 at times $t_1$-$t_4$ respectively. For simplicity, it will be assumed that tracker 100 includes a single node (i.e., R=1 in the cost function).

As described above, each time tracker 100 receives a communication from moving object 150 it can generate a corresponding angle of arrival measurements, time of arrival measurement, Doppler measurement, and node location. For example at time $t_1$, FIG. 4 represents that tracker 100 has generated $AoA_1$, $ToA_1$, $Dopp_1$, and $B(x_1, y_1, z_1)$ based on the receipt of communication 1. These measurements can then be provided to location engine 105 to allow it to estimate the position of moving object 150 when it emitted communication 1—i.e., to identify the values of $A(x_1, y_1, z_1)$ that minimize the cost function. This process can be repeated for each communication that tracker 100 receives from moving object 150. Notably, this process can be performed in real-time to produce a highly accurate and live position estimate for moving object 150. Tracker 100 could then provide these position estimates to another system to perform any desirable task such as tracking and/or steering moving object 150.

In summary, location engine 105 can be configured to estimate a position of a moving object based on multiple types of measurements obtained from processing a communication emitted by the object and based on a known location of one or more nodes that received the communication. By employing the multiple types of measurements and by minimizing a cost function based on such measurements, location engine 105 can produce accurate estimates even when a single node is available to provide measurements of the received communications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a tracker that comprises a computing system that is configured to receive periodic communications from a moving object and employ various types of information derived from the periodic communications to estimate a position of the moving object, the computing system comprising one or more computing devices, for performing multivariate position estimation to track the moving object with high accuracy, the method comprising:
   receiving periodic communications emitted from a moving object;
   processing each of the periodic communications to generate a time of arrival measurement, an angle of arrival measurement, and a Doppler measurement for each respective periodic communication;
   obtaining a tracker location representing where the tracker was located when each respective periodic communication was received; and
   tracking the moving object by iteratively estimating an object location representing where the moving object was located when the moving object emitted each respective periodic communication using the time of arrival measurement, the angle of arrival measurement, the Doppler measurement, and the tracker location for the respective periodic communication, wherein the tracker estimates the object location for the respective periodic communication by minimizing a cost function that includes:
   a time of arrival portion that incorporates the time of arrival measurement for the respective periodic communication;
   an angle of arrival portion that incorporates the angle of arrival measurement for the respective periodic communication;
   a Doppler portion that incorporates the Doppler measurement for the respective periodic communication; and
   a tracker location portion that incorporates the tracker location when the respective periodic communication was received.

2. The method of claim 1, wherein the time of arrival portion comprises:

$$\frac{\tau_{obs} - \frac{\|\vec{AB}\|}{c} - \tau_e}{\sigma_\tau}$$

where A represents the object location, B is the tracker location, $\tau_{obs}$ is the time of arrival measurement, c is the speed of light, $\tau_e$ is an emission time of the respective periodic communication, and $\sigma_\tau$ is a standard deviation of a time of arrival component that generated the time of arrival measurement.

3. The method of claim 2, wherein the time of arrival measurement is a time difference of arrival measurement.

4. The method of claim 1, wherein the angle of arrival portion comprises:

$$\frac{\theta - \varphi}{\sigma_\varphi}$$

where $\theta$ is defined as a four quadrant arctangent function of a two dimensional x, y plane between A and B where A represents the object location and B is the tracker location, $\varphi$ is the angle of arrival measurement, and $\sigma_\varphi$ is a standard deviation of an angle of arrival component that generated the angle of arrival measurement.

5. The method of claim 1, wherein the Doppler portion comprises $$\frac{f_{dm} + f_c - f_e - \frac{\|\vec{AB}\| \cdot \vec{V}}{\lambda}}{\sigma_\delta}$$

where $\sigma_\delta$ is a standard deviation of a Doppler component that generated the Doppler measurement, $f_{dm}$ is the Doppler measurement, $f_c$ is a carrier frequency of the respective communication, $f_e$ is a measured frequency error, and V is a velocity of the tracker.

6. The method of claim 1, wherein the tracker location portion comprises:

$$W^T \overline{pos}^\dagger W$$

where W=pos−$\overline{pos}$, pos is the tracker location, $\overline{pos}$ is a mean position of the tracker location, and † is defined as the pseudo inverse.

7. The method of claim 1, wherein minimizing the cost function comprises performing a non-linear least squares algorithm.

8. The method of claim 7, wherein the non-linear least squares algorithm is the Levenberg-Marquardt algorithm.

9. The method of claim 1, wherein the tracker includes multiple nodes each of which receives and processes the periodic communications to generate respective time of arrival measurements, angle of arrival measurements, and Doppler measurements for each of the respective communications and each of which obtains a tracker location pertaining to the respective node, and wherein the moving object is tracked by iteratively estimating the object location representing where the moving object was located when the moving object emitted each respective periodic communication using the time of arrival measurements, the angle of arrival measurements, the Doppler measurements and the tracker locations.

10. A tracker for performing multivariate position estimation to track a moving object with high accuracy, the tracker comprising a computing system that is configured to receive periodic communications from a moving object and employ various types of information derived from the periodic communications to estimate a position of the moving object, the computing system comprising one or more computing devices, the tracking including:
one or more antennas for receiving the periodic communications emitted from the moving object;
a time of arrival component that generates a time of arrival measurement for each respective periodic communication;
an angle of arrival component that generates an angle of arrival measurement for each respective periodic communication;
a Doppler component that generates a Doppler measurement for each respective periodic communication;
a tracker location component that obtains a tracker location representing where the tracker was located when each respective periodic communication was received; and
a location engine that receives and processes the time of arrival measurement, the angle of arrival measurement, the Doppler measurement, and the tracker location for each respective periodic communication to iteratively estimate an object location representing where the moving object was located when the moving object emitted the respective periodic communication, wherein the location engine estimates the object location for the respective periodic communication by minimizing a cost function that includes:
a time of arrival portion that incorporates the time of arrival measurement for the respective periodic communication;
an angle of arrival portion that incorporates the angle of arrival measurement for the respective periodic communication;
a Doppler portion that incorporates the Doppler measurement for the respective periodic communication; and
a tracker location portion that incorporates the tracker location when the respective periodic communication was received.

11. The tracker of claim 10, wherein the time of arrival portion comprises:

$$\frac{\tau_{obs} - \frac{\|\vec{AB}\|}{c} - \tau_e}{\sigma_\tau}$$

where A represents the object location, B is the tracker location, $\tau_{obs}$ is the time of arrival measurement, c is the speed of light, $\tau_e$ is an emission time of the respective periodic communication, and $\sigma_\tau$ is a standard deviation of the time of arrival component.

12. The tracker of claim 10, wherein the angle of arrival portion comprises:

$$\frac{\theta - \varphi}{\sigma_\varphi}$$

where θ is defined as a four quadrant arctangent function of a two dimensional x, y plane between A and B where A represents the object location and B is the tracker location, φ is the angle of arrival measurement, and $\sigma_\varphi$ is a standard deviation of the angle of arrival component.

13. The tracker of claim 10, wherein the Doppler portion comprises $$\frac{f_{dm} + f_c - f_e - \frac{\|\vec{AB}\| \cdot \vec{V}}{\lambda}}{\sigma_\delta}$$

where $\sigma_\delta$ is a standard deviation of the Doppler component, $f_{dm}$ is the Doppler measurement, $f_c$ is a carrier frequency of the respective periodic communication, $f_e$ is a measured frequency error, and V is a velocity of the tracker.

14. The tracker of claim 10, wherein the tracker location portion comprises:

$$W^T \overline{pos}^\dagger W$$

where W=pos−$\overline{pos}$, pos is the tracker location, $\overline{pos}$ is a mean position of the tracker location, and † is defined as the pseudo inverse.

15. The tracker of claim 10, wherein the tracker includes multiple nodes each of which includes:
one or more antennas for receiving the periodic communications emitted from the moving object;
a time of arrival component that generates a time of arrival measurement for each respective periodic communication received at the respective node;
an angle of arrival component that generates an angle of arrival measurement for each respective periodic communication received at the respective node;
a Doppler component that generates a Doppler measurement for each respective periodic communication received at the respective node; and
a tracker location component that obtains a tracker location representing where the respective node of the tracker was located when each respective periodic communication was received at the respective node; and
wherein the location engine receives and processes the time of arrival measurements, the angle of arrival measurements, the Doppler measurements, and the tracker locations from each node to iteratively estimate the object location representing where the moving object was located when the moving object emitted each respective periodic communication.

16. A method, performed by a tracker that comprises a computing system that is configured to receive periodic communications from a moving object and employ various types of information derived from the periodic communications to estimate a position of the moving object, the computing system comprising one or more computing devices, for performing multivariate position estimation to track the moving object with high accuracy, the method comprising:

receiving periodic communications emitted from a moving object;

processing each of the periodic communications to generate a time of arrival measurement, an angle of arrival measurement, and a Doppler measurement for each respective periodic communication;

obtaining a tracker location representing where the tracker was located when each respective periodic communication was received; and tracking the moving object by iteratively estimating an object location representing where the moving object was located when the moving object emitted each respective periodic communication using the time of arrival measurement, the angle of arrival measurement, the Doppler measurement, and the tracker location for the respective periodic communication, wherein the tracker estimates the object location for the respective periodic communication by minimizing a cost function that includes:

a time of arrival portion that incorporates the time of arrival measurement for the respective periodic communication;

an angle of arrival portion that incorporates the angle of arrival measurement for the respective periodic communication;

a Doppler portion that incorporates the Doppler measurement for the respective periodic communication; and a tracker location portion that incorporates the tracker location when the respective periodic communication was received;

wherein the tracker location is one of fixed or moving.

* * * * *